J. F. TILLERY.
TRAFFIC SIGNAL.
APPLICATION FILED SEPT. 20, 1916.
1,326,118.
Patented Dec. 23, 1919.
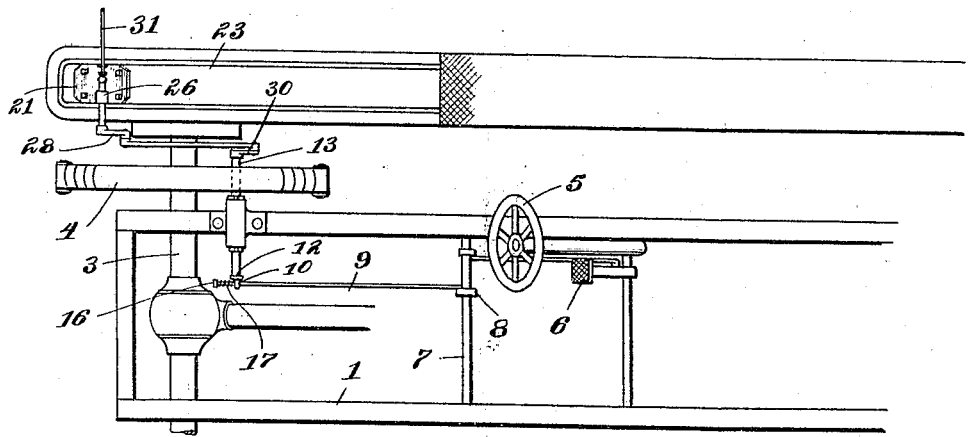
*Fig. 1*
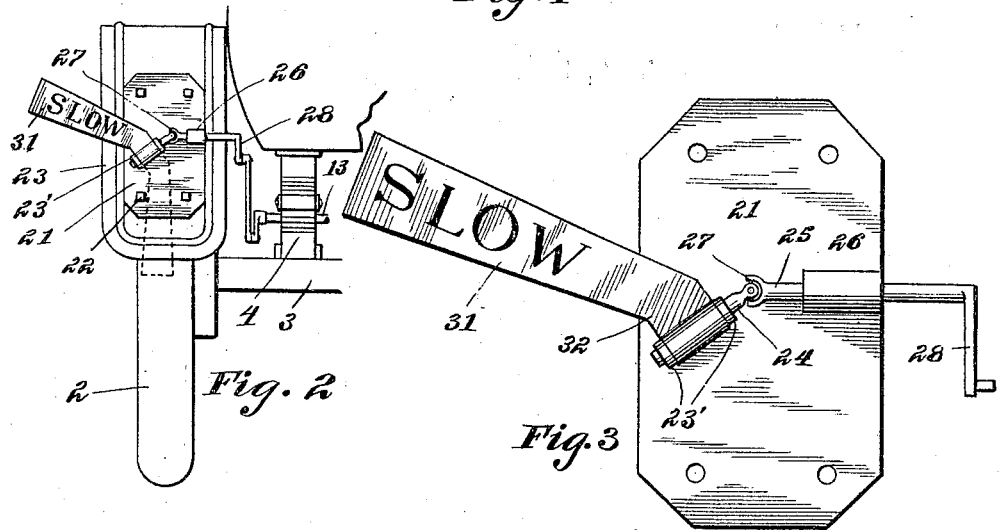
*Fig. 2*
*Fig. 3*
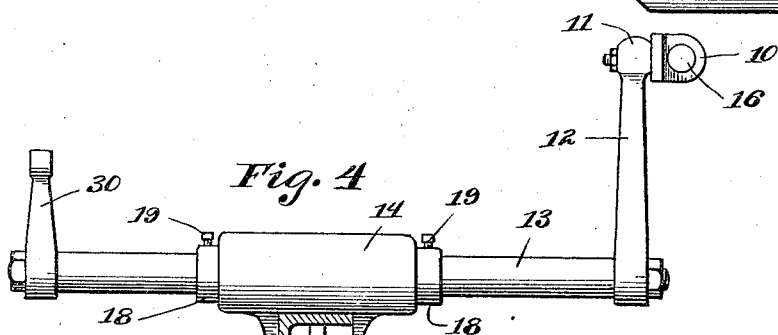
*Fig. 4*
Witnesses
C. F. Rudolph
R. M. Smith
Inventor
John F. Tillery
By Victor J. Evans
Attorney

UNITED STATES PATENT OFFICE.

JOHN F. TILLERY, OF DALLAS, TEXAS.

TRAFFIC-SIGNAL.

1,326,118.

Specification of Letters Patent.

Patented Dec. 23, 1919.

Application filed September 20, 1916. Serial No. 121,232.

*To all whom it may concern:*

Be it known that I, JOHN F. TILLERY, a citizen of the United States, residing at Dallas, in the county of Dallas and State of Texas, have invented new and useful Improvements in Traffic-Signals, of which the following is a specification.

This invention relates to traffic signals, the object in view being to provide simple and reliable signaling means applicable to any automobile at present in use, whereby a signaling member which is practically unnoticeable at other times, may be shifted to an exposed signaling position simultaneously with the application of the brake or brakes of the machine, thus notifying a following machine or vehicle that the operator is about to make a turn or bring his vehicle to a stop. One of the principal objects of the invention is to provide in connection with suitable operating mechanism, a signaling member which is so mounted on the machine that it has both a vertical and a lateral movement at the same time, the signaling member being supported by one of the rear mud guards or fenders against which it normally lies and being adapted when swung upwardly to also move outwardly to a position where it projects beyond one of the side lines of the vehicle.

With the above and other objects in view, the invention consists in the novel construction, combination and arrangement, herein fully described, illustrated and claimed.

Figure 1 is a plan view of a sufficient portion of the chassis of an automobile to illustrate the improved signaling apparatus in its applied relation thereof, showing also the signal operating means.

Fig. 2 is a fragmentary rear elevation of an automobile showing the signaling position of the device.

Fig. 3 is a plan view of the base plate showing the manner of mounting the signaling member thereon.

Fig. 4 is a detailed rear elevation of the rock shaft and the parts intimately associated therewith.

Referring to the drawings, 1 designates the frame of an automobile, 2 the driving wheels, 3 the rear axle housing, 4 the springs, 5 the steering wheel, 6 the foot pedal brake lever and 7 one of the brake rods or levers, all of said parts being of the usual construction and arrangement.

In carrying out the present invention, I provide an additional arm 8 on the lever 7 and attached to said arm a signal operating rod 9 which extends rearwardly and passses through a swivel eye 10 mounted to turn in a bearing 11 at the extremity of one arm 12 of a rock shaft 13 mounted in a bearing 14 secured to one of the side frame bars 15. The rod 9 is provided at its rear extremity with a head 16 and a cushioning spring 17 is interposed between the head 16 and the bearing eye 10, said spring encircling the rod 9 and serving in addition to its cushioning function, to compensate for any variation in the amplitude of movement of the brake lever and signaling member hereinafter more particularly referred to.

The shaft 13 is provided with stop collars 18 at opposite sides of the bearing 14 each collar having a set screw 19 by means of which it may be fastened to the shaft 13. The collars 18 admit of the shaft 13 being adjusted longitudinally to suit the vehicle to which the signaling apparatus is applied. The bearing 14 may be fastened to the frame bearing 3 by any suitable means such as bolts 20.

21 designates a support or base plate which, in the preferred embodiment of this invention, is secured by fasteners 22 to the upper surface of one of the rear fenders or mud guards 23 of the machine. On its upper face the base plate 21 is provided with bearings 23 in which is mounted one section 24 of a rock shaft 25 the initial portion of which is journaled in bearings 26 on the base plate 21. The section 25 of the shaft extends substantially parallel to the rock shaft 13 while the section 24 of the shaft extends at an oblique angle, the sections 24 and 25 of the shaft being connected together by a universal joint 27 and thus constituting a tumbling shaft. The shaft section 25 is terminally provided with an arm 28 from which a connecting rod extends to another arm 30 on the opposite end of the shaft 13 from the arm 12 previously described.

Fixedly secured to the oblique section 24 of the shaft carried by the base plate 21 is a signaling member 31 which is curved or bent between the ends thereof as indicated at 32. By reason of the construction just described, when the signaling member 31 is moved from its substantially horizontal position to its signaling position, it swings upwardly and outwardly at the same time thereby causing the signal to assume a substantially vertical position and also to project beyond the adjacent side line of the vehicle thereby notifying persons in rear of the machine and also in front of the machine that the operator is about to either make a stop or steer the machine to one side or the other. This does away with the necessity of extending the arm and hand of the operator, leaving both of his hands free to manipulate the controls of the machine. Preferably the connections are arranged as above described so that the signaling member will be displayed whenever the operator presses upon the lever, it being understood that the brake lever usually has considerable throw before the brakes are actually applied. This throw of the lever is amply sufficient to elevate the signaling member to its operative or useful position, after which the operator may continue the braking movement of the brake pedal without further movement of the signaling member, due to the use of the combined cushioning and compensating spring 17.

By disposing the shaft section 24 obliquely with respect to the path of movement of the vehicle, when the signal arm 31 is swung rearwardly as indicated by dotted lines in Fig. 2 it hangs in a substantially vertical position or in trailing relation to the mudguard and rear wheel. On the other hand when the signal arm 31 is swung in the opposite direction, it moves outwardly simultaneously with its upward movement as indicated by full lines in Figs. 2 and 3 thus clearly displaying the cautionary side of the signal arm.

I claim:

The combination of a supporting plate adapted to be fastened to a vehicle in a flat horizontal position within the side lines of the vehicle, a tumbling shaft journaled in bearings on said support, one section of said tumbling shaft disposed transversely and another obliquely with respect to the normal path of movement of the vehicle, manually controlled means for rocking the transversely disposed section of said tumbling shaft, and a signaling member having a fixed relation to said oblique section of the tumbling shaft whereby when said shaft is turned said signaling member is moving to a projecting position beyond the adjacent side line of the vehicle or to a retracted position within such line where it lies flatwise upon said supporting plate.

In testimony whereof I affix my signature.

JOHN F. TILLERY.